United States Patent [19]
Griffith et al.

[11] Patent Number: 4,490,794
[45] Date of Patent: Dec. 25, 1984

[54] ALTITUDE PRESELECT SYSTEM FOR AIRCRAFT WITHOUT AIR DATA COMPUTER

[75] Inventors: Carl D. Griffith, Phoenix, Ariz.; Paul A. Rauschelbach, Northridge, Calif.; Robert W. Robinson, Phoenix; Edmund R. Skutecki, Glendale, both of Ariz.

[73] Assignee: Sperry Corporation, New York, N.Y.

[21] Appl. No.: 339,951

[22] Filed: Jan. 18, 1982

[51] Int. Cl.$^3$ .............................................. G05D 1/08
[52] U.S. Cl. .................................... 364/433; 364/434; 318/584; 244/180
[58] Field of Search ............... 364/433, 434; 240/180, 240/181, 186, 187; 73/178 R, 178 T; 318/584; 340/27 NA, 27 R

[56] References Cited

U.S. PATENT DOCUMENTS

| | | | |
|---|---|---|---|
| 3,524,612 | 8/1970 | Ainsworth | 244/180 |
| 3,545,703 | 12/1970 | Montvale | 244/180 |
| 3,578,269 | 5/1971 | Kramer et al. | 244/180 |
| 3,638,092 | 1/1972 | Kammerer | 244/180 |
| 3,899,661 | 8/1975 | Lehfeldt | 244/180 |
| 4,012,626 | 3/1977 | Miller et al. | 244/180 |
| 4,114,842 | 9/1978 | Hofferber et al. | 364/433 |
| 4,377,848 | 3/1983 | Flannigan et al. | 364/433 |

Primary Examiner—Gary Chin
Attorney, Agent, or Firm—Howard P. Terry

[57] ABSTRACT

An altitude preselect apparatus for use with or incorporation into an automatic flight control system combines the incremental altitude signal from a pneumatic encoding altimeter with a vertical speed computation to generate a smooth, continuous instantaneous altitude signal. A vertical speed reference signal is generated to control the vertical flight path of the aircraft when the instantaneous altitude reaches a prescribed proximity to a desired flying altitude which is manually selected by the pilot. The apparatus initiates a capture sequence to hold the aircraft at the desired altitude once it is reached.

25 Claims, 7 Drawing Figures

ALTITUDE PRESELECT SYSTEM FOR AIRCRAFT WITHOUT AIR DATA COMPUTER

BACKGROUND OF THE INVENTION

1. Field of the Invention

The present invention relates generally to automatic flight control systems for aircraft, and more specifically to an altitude preselect control system for both fixed wing and helicopter aircraft which are not equipped with an air data computer.

2. Description of the Prior Art

The automatic flight control system, or autopilot, is growing in popularity among the owners of smaller, business or general aviation aircraft, and of course, a primary concern of such owners is the cost of the system. To keep cost to a minimum many automatic flight control systems for small aircraft are of the simple primarily pilot relief type, which provide attitude stabilization and minimal maneuver capability. Such a system is described in U.S. Pat. No. 3,848,833, issued to Applicant's assignee. Few systems of this type include an altitude preselect function. Altitude preselect is one of a number of very convenient flight path control functions found in more elaborate commercial and military automatic flight control systems. It permits the pilot to preselect a desired flying altitude, then to put the aircraft into a climb or descent at a rate calculated to maximize fuel economy, for example. The altitude preselect function assumes control of the climb or descent when the desired altitude is approached to smoothly and gently capture the aircraft at the desired altitude and hold it there. In these more elaborate systems as air data computer implements the altitude preselect function. The air data computer is capable of providing a continuous measure of actual altitude and rate of climb or descent for controlling the flight path of the aircraft and for display within the cockpit. But air data computers may be too costly for the small aircraft owner, hence only a few small aircraft have this luxury item.

However, substantially all aircraft using U.S. air space include, by FAA regulations, a pneumatic encoding altimeter for transmitting aircraft altitude through a transponder to ground stations for enroute and terminal traffic control purposes. The pneumatic encoding altimeter is typically of the type described in U.S. Pat. No. 4,133,209 in which the altitude is sensed pneumatically, referenced to standard barometric pressure at sea level (29.92 in. Hg), and transmitted in encoded fashion to a ground station. The altimeter is usually provided with a manually operable calibration control for adjusting a graduated scale plate. By setting the calibration control in accordance with locally reported ambient barometric pressure, the altimeter gives a cockpit indication of actual aircraft altitude. The encoded signal transmitted to the ground station is not affected by the calibration control, and is thus always referenced to 29.92 in. Hg. Changes in altitude of an aircraft carrying the encoding altimeter are accompanied by changes in ambient pressure, and thus cause movement of a pointer over the scale plate and also cause rotation of a shaft coupled to, for example, an optical encoding angular position sensor. The resolution of an encoding altimeter is, by Federal regulation, 100 feet. In other words, the optical encoding angular position sensor produces a signal representing altitude change in 100 foot increments. Because the output of the encoding altimeter is not a smooth and continuous representation of actual instantaneous altitude, such an altimeter has not been used heretofore in an automatic flight control system to provide the altitude preselect function.

Thus it is an object of this invention to provide a low cost altitude preselect apparatus for use with aircraft not equipped with a costly air data computer. Another object is to make the altitude preselect apparatus compatible with existing automatic flight control systems. Yet another object is to utilize existing aircraft instruments and sensors, such as a pneumatic encoding altimeter, to provide instantaneous altitude and vertical speed information needed as control data for the altitude preselect apparatus.

SUMMARY OF THE INVENTION

The present invention provides an inexpensive altitude preselect apparatus for use with an automatic flight control system of the type generally used in small and medium size general aviation aircraft, in which only the minimal pilot assist functions are provided. The invention makes use of standard cockpit instruments and sensors common to such aircraft, including a pneumatic encoding altimeter which provides a signal representing incremental changes in altitude. The altitude preselect apparatus comprises a barometric pressure sensor of the type common to inexpensive automatic flight control systems, and further comprises a manually operable control for selecting a desired altitude and for providing a signal representing that altitude. An altitude preselect computer receives the encoding altimeter's incremental altitude signal and blends it with a vertical speed computation to generate a smooth, continuous signal representing the instantaneous altitude of the aircraft. The instantaneous altitude is referenced to locally reported ambient barometric pressure by means of a calibration potentiometer which is slaved to the pilot operated readout adjustment knob located on the encoding altimeter. The invention further comprises a flare function generator within the altitude preselect computer which receives the desired altitude signal and the instantaneous altitude signal and produces a vertical speed reference signal characterized by a piecewise-linear function which reduces to zero as the desired altitude is approached. The vertical speed reference signal is selectively applied to the automatic flight control system to reduce the vertical speed of the aircraft to substantially zero when the instantaneous altitude reaches a prescribed relation to the desired altitude. The invention further comprises a means for engaging the existing automatic hold function of the flight control system when the desired altitude reaches a second prescribed relation to the desired altitude.

DESCRIPTION OF THE PREFERRED EMBODIMENT

Figures 1A, 1C:
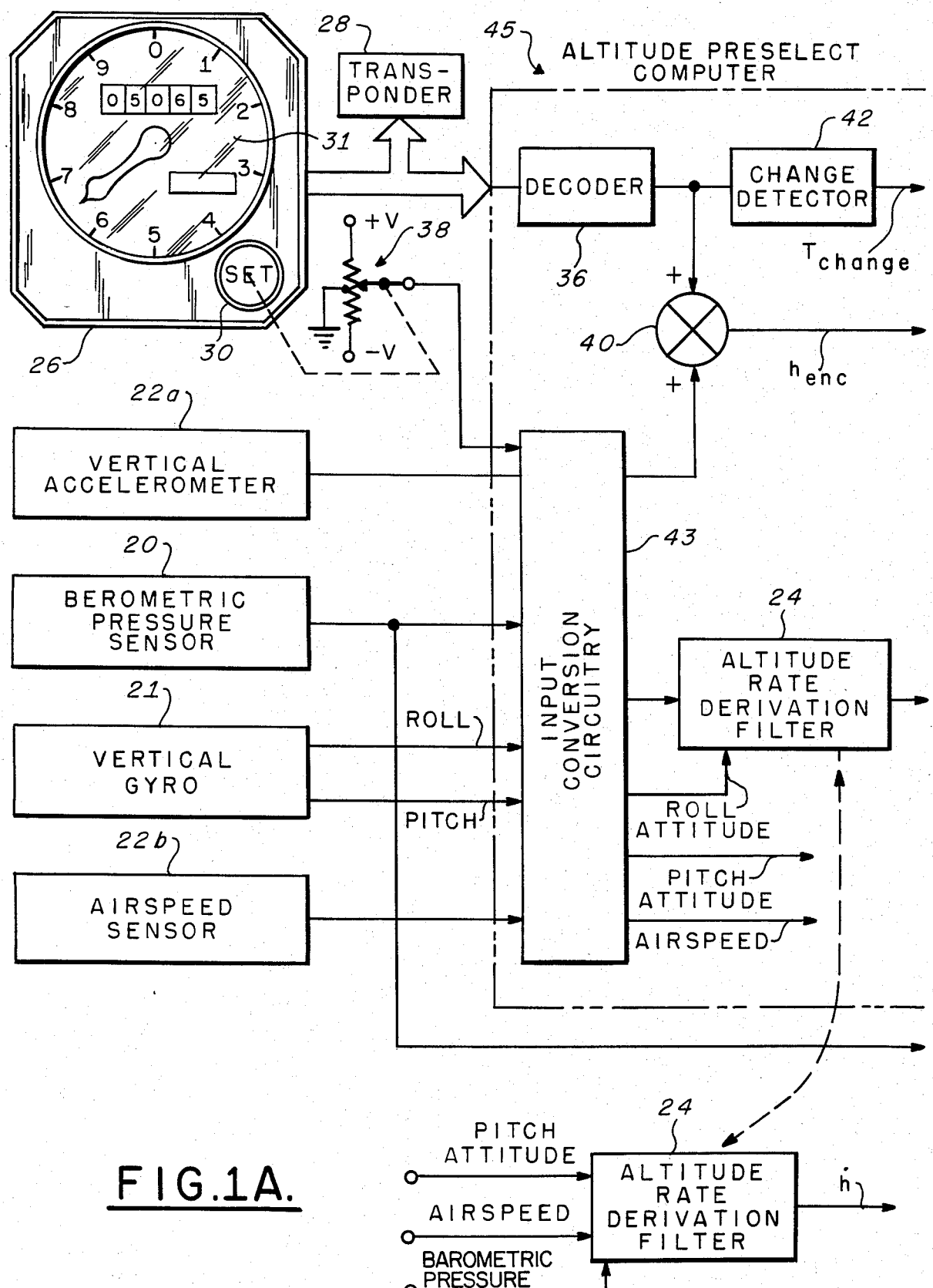
FIGS. 1A and 1B are a schematic block diagram of the invention shown in relation to existing automatic flight control systems and other standard aircraft instruments and sensors.
FIG. 1C is a schematic block diagram of an alternative vertical speed computation means for use in relation to the invention.

The present invention provides the highly desirable altitude preselect capability for low cost automatic flight control systems found in small, business or general aviation aircraft of both the fixed wing and helicopter types. The altitude preselect apparatus makes advantageous use of the aircraft existing automatic flight control system and the pneumatic encoding altimeter, required by FAA regulations on board all aircraft using regulated U.S. airspace, as well as other sensors common to aircraft not supplied with air data computers. FIG. 1 shows in block diagram the present invention and its relation to these existing systems, altimeter, and other sensors.

Figure 1B:
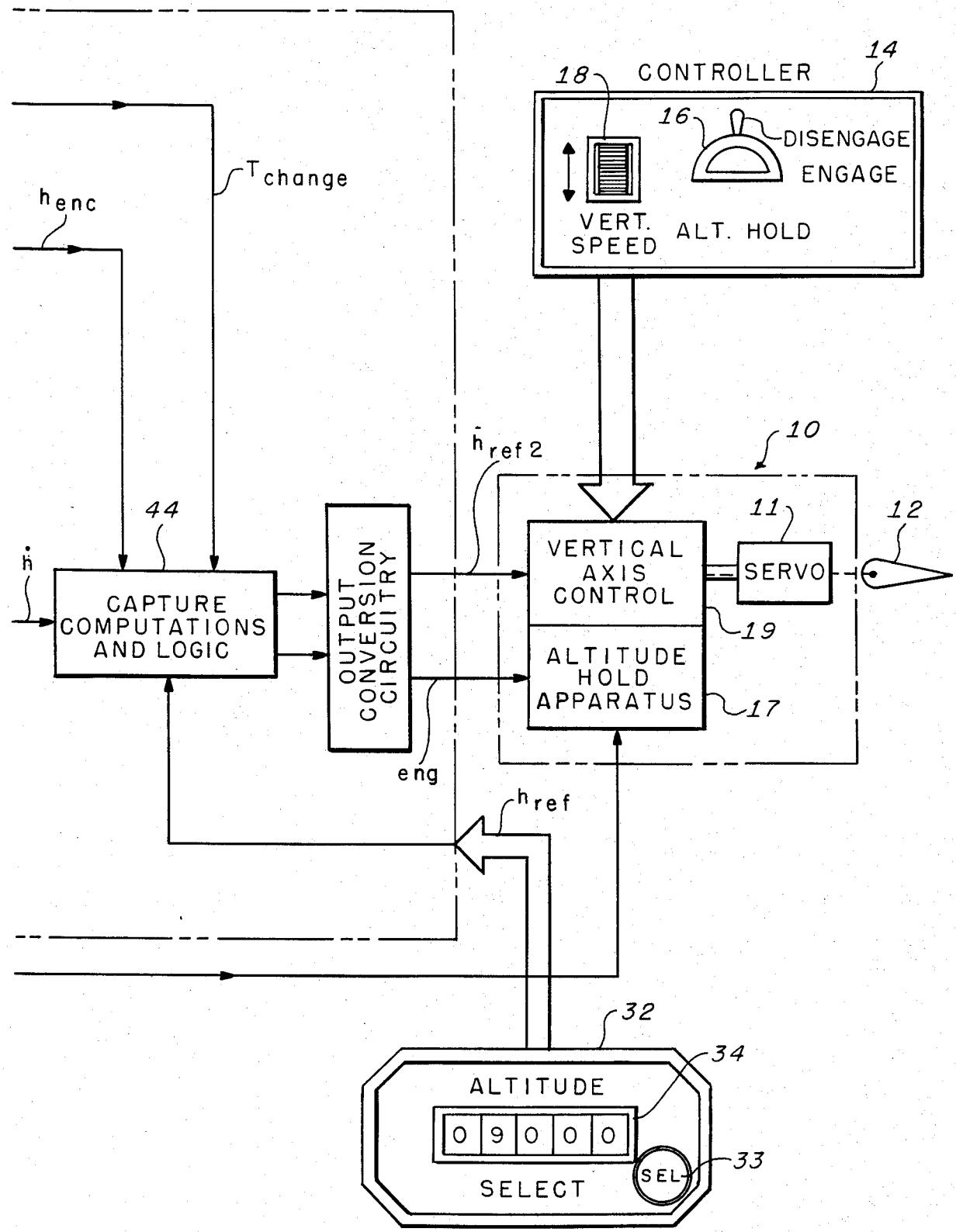

The conventional automatic flight control system 10, which may be either the automatically actuated, autopilot type, or the manually actuated, flight director type, provides servo control of the aircraft's vertical axis or vertical flight path through control servo 11 and the control surface 12. The automatic flight control system may preferably be of the type offering a variety of path control modes selectable by the pilot, such as the automatic flight control system disclosed in U.S. Pat. No. 3,848,833, assigned to Applicants' assignee. While some commercially available systems offer a variety of lateral and vertical modes, practically all have the altitude hold mode and some climb or descent mode, often allowing a constant rate of climb or descent to be preselected. These modes are selected by manually operable switches on a controller 14 located in the cockpit of the aircraft. To simplify illustration, the controller 14 of FIG. 1B shows only the controls associated with the altitude hold mode and a simple, constant rate climb or descent mode. It will be understood that other more sophisticated vertical modes, such as glide slope, flare, and autolanding may be included in a particular automatic flight control system and that the present invention will work equally well with these more sophisticated systems. The controller 14 has an engage switch 16 for actuating the altitude hold apparatus 17 of the flight control system 10, and also includes a vertical speed selector 18 for producing a command signal to the flight control system's vertical axis control 19 to produce a steady climb or descent at a rate selected by the pilot.

In the typical low cost flight control system the automatic hold apparatus 17 relies on the output of an altitude sensor or barometric pressure sensor 20 to provide dynamic altitude information. Typically this sensor is quite sensitive to slight changes in barometric pressure; thus it is said to have good resolution, and is well suited for use in an altitude hold, closed loop control circuit. The sensor's static accuracy, which is its ability to provide an actual numeric altitude is often poor. This poor static accuracy does not affect the sensor's performance in the altitude hold apparatus, however, it could adversely affect performance of an altitude preselect system based on this sensor alone. As taught in U.S. Pat. No. 3,077,577, assigned to Applicants' assignee, the output from the barometric pressure sensor 20, FIG. 1A, together with an output from a vertical accelerometer 22a are applied through conventional input conversion circuitry 43 to rate derivation filter 24 which provides a signal h representing the aircraft's vertical speed or its rate of climb or descent. Also applied to conversion circuitry 43 are pitch and roll signals from a vertical gyroscope 21 and an airspeed signal from airspeed sensor 22b. In an alternative embodiment the pitch axis of a vertical gyro 21 and airspeed sensor 22b supply signals in conjunction with the barometric pressure sensor 20 to the rate derivation filter 24, as shown in insert FIG. 1C to provide h.

A pneumatic encoding altimeter 26, packaged separately, is usually not considered part of the automatic flight control system. It provides a digitally encoded signal to a transponder 28 for transmitting aircraft altitude to ground stations for air traffic control purposes. The pneumatic encoding altimeter 26 may be of the type disclosed in U.S. Pat. No. 4,133,209 in which the altitude is sensed pneumatically, referenced to standard barometric pressure at sea level (29.92 in. Hg). The altimeter is usually furnished with a manually operable readout adjustment knob 30 for adjusting the altitude reading displayed in the cockpit. The adjustment knob changes the cockpit altitude reading but does not change the encoded signal reported via the transponder 28 to the ground station. Unlike the barometric pressure sensor 20, the pneumatic encoding altimeter 26 has good static accuracy, but poor resolution. Typically the encoded output represents gross incremental changes or altitude transitions at 100 feet intervals.

The altitude preselect apparatus of the present invention within the blocks outlined by broken lines in FIG. 1, may be implemented using digital or analog circuitry and would normally be included as part of the flight control system's package. The preferred embodiment is digital due to the complex digital nature of the pneumatic encoding altimeter's output. The invention comprises an altitude preselect control 32 with manually operable selector knob 33 with which the pilot can select a desired flying altitude. The control 32 provides an electrical signal $h_{ref}$ representing the pilot's desired altitude, and also includes a visual readout 34, preferably digital, for indicating the selected altitude. A decoder 36 is connected to receive and decode the encoded output signal from the altimeter 26 and provides a signal representing gross incremental changes in altitude, typically at the 100 foot intervals described above.

Because the output of the pneumatic encoding altimeter is always referenced to standard barometric pressure (29.92 in. Hg), the altitude preselect apparatus must be calibrated in accordance with locally reported barometer settings. For this purpose the invention includes a calibration control 38 which is preferably slaved to the pilot operated readout adjustment knob 30 and is capable of producing an electrical signal in response to manual adjustment of the knob. The calibration control may be, for example, a potentiometer in tandem with the readout adjustment knob 30 and a voltage source across the potentiometer for producing an analog signal. The analog signal can then be digitized in an A/D converter to be compatible with the digital format of the altitude preselect computer 45. It will be seen that by slaving the calibration control 38 to the readout adjustment knob 30, the pilot automatically calibrates the altitude preselect apparatus of the invention with every routine calibration of the pneumatic encoding altimeter 26. In an alternative embodiment, the calibration control might be included as a vernier adjustment to the altitude preselect control 32. The output from decoder 36 and calibration control 38 are combined in a summer 40 to produce a signal $h_{enc}$ representing incremental changes in altitude referenced to locally reported barometric conditions. A change detector 42 responsively coupled to the decoder 36 produces a trigger pulse $T_{change}$ as each incremental altitude transition occurs, typically producing 1 pulse every 100 feet.

An altitude preselect computer 45 includes a capture computation and logic circuit 44 which receives the desired altitude signal $h_{ref}$, the calibrated incremental altitude signal $h_{enc}$, trigger signal $T_{change}$, and the vertical speed signal $\dot{h}$ from rate derivation filter 24. The altitude preselect computer 45 interfaces with the automatic flight control system 10, providing a vertical speed command signal $\dot{h}_{ref2}$ to the vertical axis control 19, and intermittently providing an engage signal ENG to the altitude hold apparatus 17.

Figure 2:
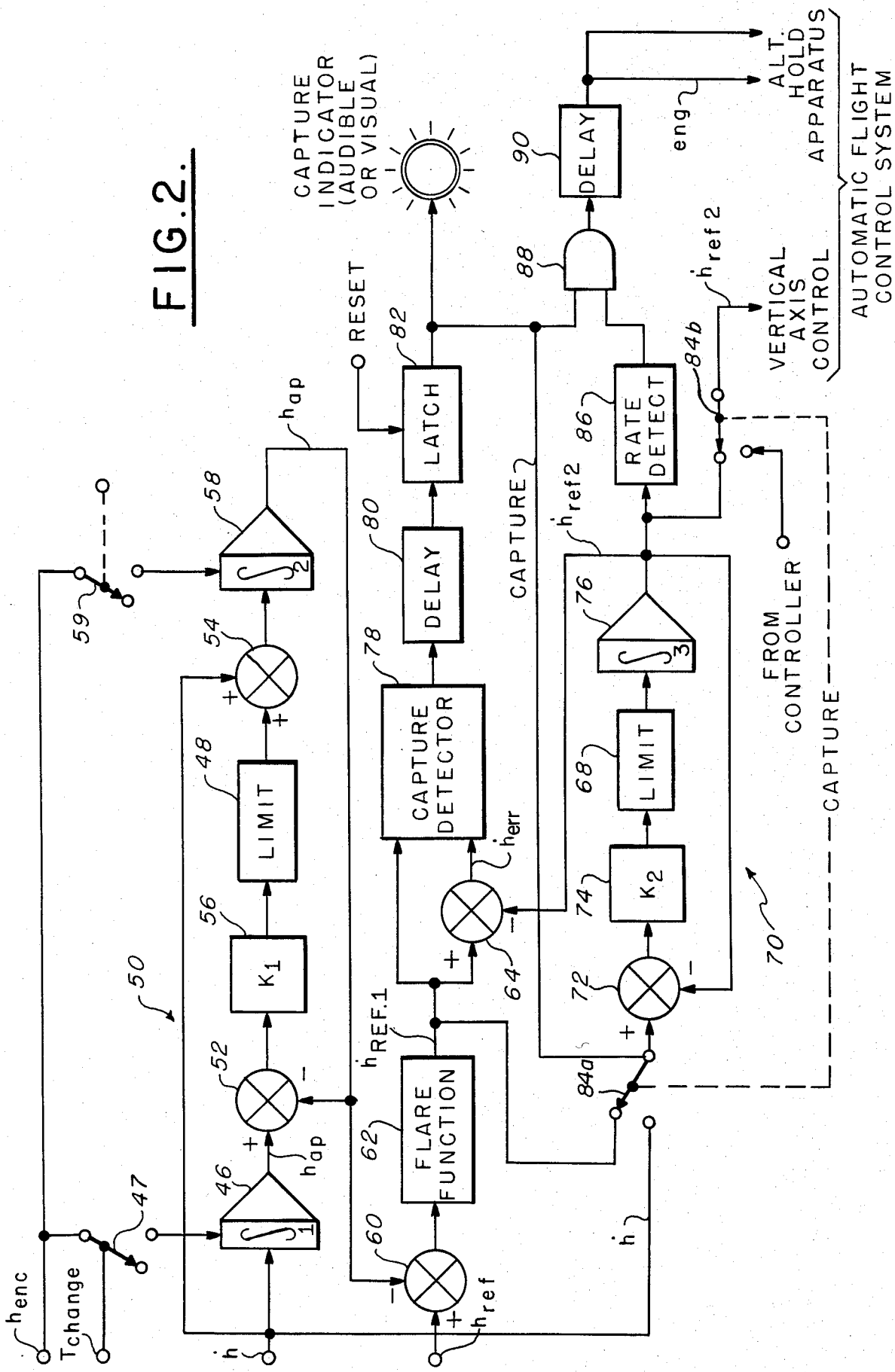
FIG. 2 is a more detailed schematic diagram of the altitude preselect circuit of the invention.

FIG. 2 of the drawings shows the capture computation and logic circuit 44 in greater detail. While FIG. 2 shows the computation in analog form, the preferred embodiment actually employs microprocessor based digital computations. A first integrator 46 receives the vertical speed signal $\dot{h}$ and intermittently receives the incremental altitude signal $h_{enc}$ which is applied through a logic switch 47 actuated by trigger pulse $T_{change}$. Integrator 46 time integrates $\dot{h}$ between successive $T_{change}$ trigger pulses, wherein $h_{enc}$ is applied to integrator 46 to set the initial value or condition upon which integration is performed. The first integrator 46 generates, form the intermittent incremental altitude signal, a smooth measure of instantaneous actual altitude by integrating the rate of climb or descent. The output of first integrator 46 is processed through a combination rate limiter and lag network 50, comprising limiter 48, second and third summing junctions 52 and 54, a gain constant 56, and a second integrator 58. Feedback from integrator 58 to summing junction 52 establishes a lag time constant in the usual fashion. The rate limit and lag time constants are selected to prevent momentary pressure changes, as may be encountered when flying through high or low pressure pockets, from affecting the operation of the altitude preselect apparatus. Typically, the rate limit might be on the order of 10 feet per second and the lag might be on the order of ½ of a second. The vertical speed signal $\dot{h}$ is also applied through third summing junction 54 to insure that the limiter/lag circuit can follow rates in excess of the rate limit provided by the rate limiter 48. The output $h_{ap}$ of integrator 58 represents a smooth, instantaneous altitude with respect to locally reported barometric condition on the ground. The invention also includes a system initialization switch 59 which selectively applies the incremental altitude signal $h_{enc}$ to second integrator 58.

Figure 3:
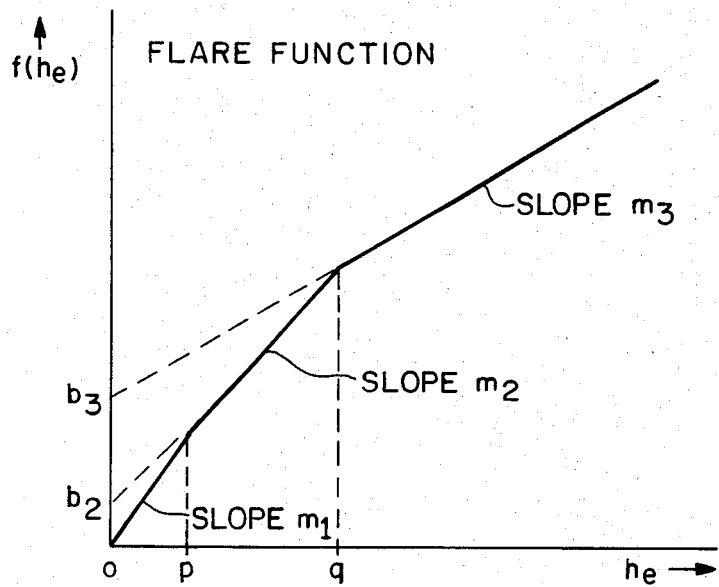
FIG. 3 is a graphical representation of a flare function generated by the altitude preselect apparatus.
Figure 4:
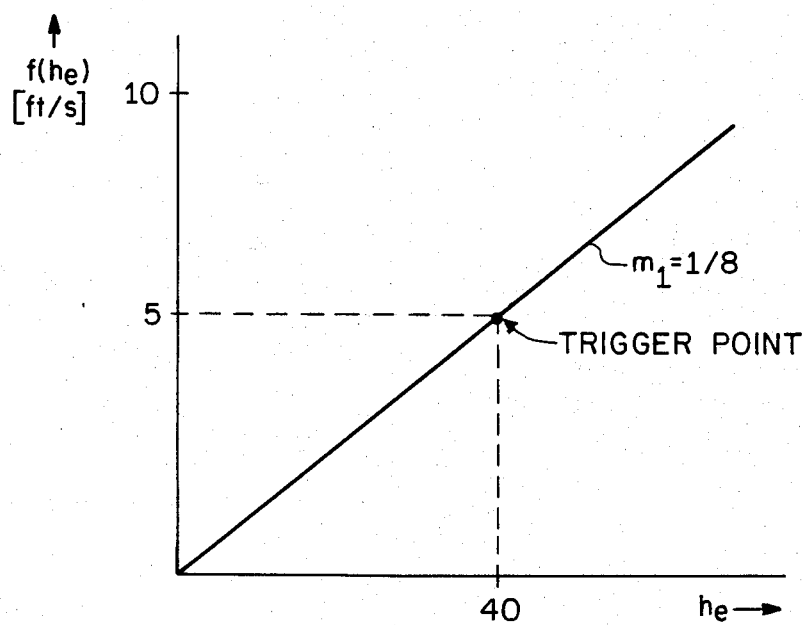
FIG. 4 is another graph of the flare function of FIG. 3 enlarged about the origin.

The instantaneous relative altitude signal $h_{ap}$ and the desired altitude signal $h_{ref}$ are subtracted in a fourth summing junction 60 to produce a first error signal which is applied to a flare function generator 62. Insert FIG. 3 shows the input/output characteristics of function generator 62 in its presently preferred form. In FIG. 3 and in Equation 1 the absolute difference between $h_{ref}$ and $h_{ap}$ is designated as error signal $h_e$, that is $$|h_{ref} - h_{ap}| 32 h_e.$$

The function generator output $h_{ref1}$ is a piecewise-linear function of $h_e$. By piecewise linear it is meant that the range of the function $f(h_e)$ may be divided into a finite number of intervals, such that $f(h_e)$ is linear inside each interval, although the slope of each linear segment may differ from interval to interval. In FIG. 3 and in Equation 1 it will be seen that the presently preferred flare function is divided into a first interval $f(0)$ to $f(p)$, a second interval $f(p)$ to $f(q)$, and a third interval greater than $f(q)$. It will be understood that more or fewer intervals could be used. The slope $m_1$ of the first interval is greater than the slope $m_2$ of the second interval, which are in turn greater than the slope $m_3$ of the third interval. For instance, $m_1$ might be $\frac{1}{8}$ sec$^{-1}$, $m_2$ might be $1/12$ sec$^{-1}$, and $m_3$ might be $1/24$ sec$^{-1}$. The following algebraic representation further describes the piecewise-linear flare function.

$$f(h_e) = \begin{cases} m_1 h_e, & h_e < p \\ m_2 h_e + b_2, & p \leq h_e \leq q \\ m_3 h_e + b_3, & h_e > q \end{cases}$$

wherein, p and q are in the domain of the function and $p<q$. It will be recognized that each segment of the above expressed function takes the familiar $y=mx+b$, slope-intercept form. Referring to FIG. 3, note that the value of the function decreases with the decrease in $h_e$ and becomes zero as $h_e$ becomes zero. While a piecewise-linear function is presently preferred, it will be appreciated that the flare function need not be piecewise-linear; a continuous function with compatible slope characteristics and the same zero crossing might alternatively be selected, to give another example.

The vertical speed signal $\dot{h}$ is normally applied through an active switching means 84a to a second limiter 68 and a second lag network 70. The latter network comprises a summing junction 72, gain constant 74, and integrator 76 with feedback from integrator 76 to summing junction 72 to establish a time constant. This second rate limiter and lag network essentially eliminates excessive deceleration and erroneous capture by making the system less responsive to spurious atmospheric pressure fluctuations, or transient vertical speed fluctuations caused by pilot inattention or activation of certain systems such as aircraft landing gear or flaps. The second rate limiter and lag network processes $\dot{h}$ to provide a smooth vertical speed signal $\dot{h}_{ref2}$ which is subtracted from the flare function signal $h_{ref1}$ in a fourth summing junction 64 to produce a second error signal $h_{err}$. The output $h_{err}$ of summing junction 64 is applied to a capture detector 78. Also applied to capture detector 78 is the flare function signal $h_{ref1}$. The capture detector senses when $\dot{h}_{ref2}$ exceeds $h_{ref1}$ and produces a signal when this capture condition exists. This may be implemented by a logic circuit which determines when the polarities of $h_{ref1}$ and $h_{err}$ differ. The capture detector signal is applied through a delay circuit 80 with time constant $t_1$ and a resettable latch 82 which cooperate to sample the capture detector output and hold that value if the capture condition exists longer than time $t_1$. When capture occurs an audible or visual indication is provided to the pilot through an indicator 83, and the active switching means 84a and 84b is energized. The switching means 84a, when actuated, disconnects the vertical speed signal $\dot{h}$ applied to summing junction 72, and simultaneously applies the flare function $h_{ref1}$ to summing junction 72. Likewise active switch 84b simultaneously disconnects the conventional vertical command signal of controller 14 and applies $\dot{h}_{ref2}$ to the vertical axis control circuits 19 of the automatic flight control system 10. Thus it will be seen that during the capture sequence the aircraft's vertical velocity is controlled by flare function generator 62 and the velocity will reduce to zero in accordance with the flare function as the desired altitude is approached.

A rate detector 86 monitors the vertical speed signal $h_{ref2}$ at the output of integrator 76 and when the absolute value of this signal is less than a predetermined small amount, typically 1 foot per second, a logic signal is applied to an AND gate 88. The AND gate 88 is also responsive to the logic condition of latch 82 and produces a signal applied to a second delay circuit 90 with time constant $t_2$. The AND gate 88 and delay circuit 90 cooperate to produce an engage signal ENG for actuating the automatic hold apparatus 17 of the automatic flight control system when $h_{ref2}$ is less than the predetermined small value for a time $t_2$. Typically, this small value may be 1 foot per second and $t_2$ may be 1 second.

Figure 5:
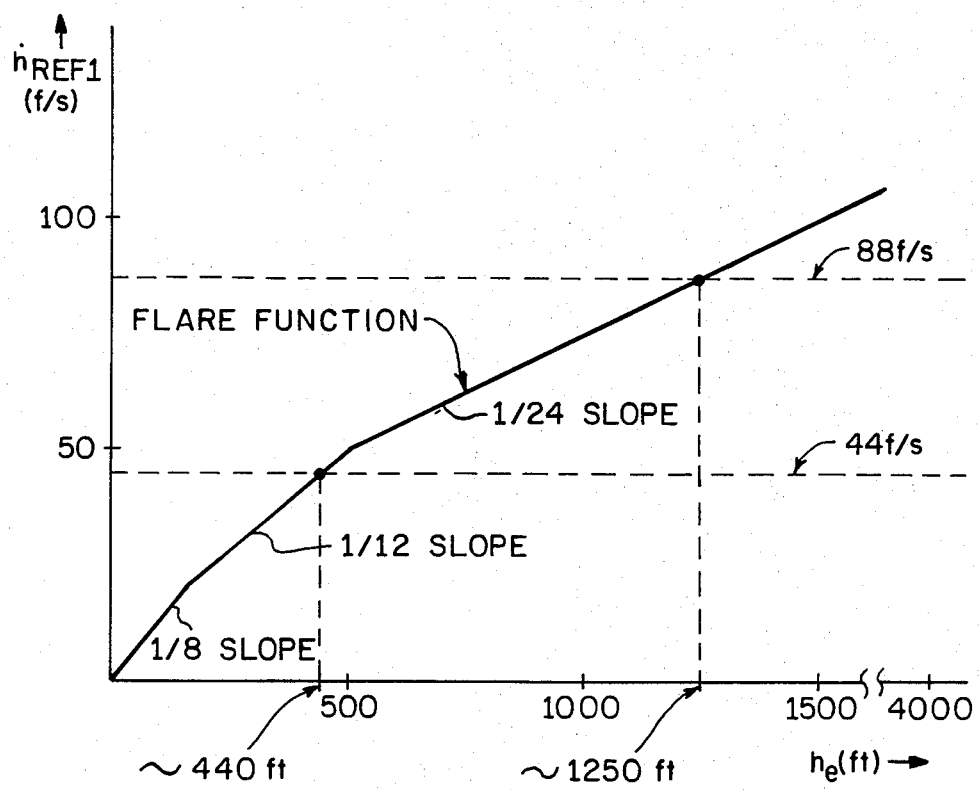
FIG. 5 is a graph useful in describing the operation of the invention.

For a better understanding of the invention and its operation, reference is made to FIG. 5 of the drawings, wherein the flare function $h_{ref1}$ is depicted as a piecewise-linear function generally described above. However, it will be recalled that the invention is not limited to piecewise-linear functions and thus the particular slope characteristics of the function are selected to illustrate the operation of the invention and not to limit its scope.

In a first example, assume that the aircraft is flying at an altitude of 5,000 feet and the pilot wishes to climb to 9,000 feet at a climb rate or vertical speed of 88 feet per second. For purposes of this example, it will be assumed that the pneumatic encoding altimeter 26 has been calibrated in accordance with locally recorded barometer settings. The pilot would first set the altitude preselect control 34 to a setting of 9,000 feet and would adjust the vertical speed switch 18 to produce a climb rate of 88 feet per second. At the same time the pilot engages the altitude preselect apparatus by activating the system on/off switch 59. As the aircraft begins to climb the barometric pressure sensor 20, in cooperation with the altitude rate computation 24 and other sensors, responds to the decrease in atmospheric pressure by producing the vertical speed signal h. As the aircraft climbs past each individual 100 foot transition, the pneumatic encoding altimeter 26 produces an output signal representing these transitions. Change detector 42 senses each transition and activates switch 47 to apply the encoding altimeter signal $h_{enc}$ to the first integrator 46. Integrator 46 generates from the encoding altimeter signal $h_{enc}$ and the vertical speed signal h a smooth signal representing instantaneous actual altitude $h_{ap}$. The actual altitude $h_{ap}$ is compared with the desired 9,000 feet to produce a difference signal $h_e$. This difference signal $h_e$ is used to generate the flare function $h_{ref1}$ according to the relationship shown in FIG. 5. As the aircraft climbs to an altitude of say 7500 feet, 1500 feet below the desired flying altitude, FIG. 5 shows that the flare function $h_{ref1}$ will have a value of 100 feet per second. Thus at 1500 feet below the desired altitude the flare function value is greater than the 88 feet per second climb rate shown as a dashed line. When the aircraft altitude is within approximately 1250 feet of the desired 9,000 foot altitude it will be seen that the flare function value is equal to the 88 feet per second climb rate. At this point the capture detector 78 emits a signal to the delay circuit 80 and latch 82, and the capture sequence is initiated one second later. On capture, active switch 84a and 84b is actuated to disconnect the 88 feet per second command signal to the flight control system, and to connect the flare function signal to the same. The aircraft will continue to climb towards the desired 9,000 foot altitude, however, at an ever diminishing rate according to the slope of the flare function. Imediately after capture, in this example, the aircraft's climb rate diminishes 1 ft/sec. for every 24 feet of climb. However, when the aircraft is within approximately 500 feet of the 9,000 foot mark, the climb rate begins to diminish even faster at a rate of 1 ft/sec. for every 12 feet of climb. Similarly, as the aircraft climbs to within approximately 160 feet of the desired altitude, the climb rate diminishes still faster, at a rate of 1 ft/sec for every 8 feet of climb. Following the flare function graph of FIG. 5, it will be seen that the aircraft's climb rate reduces to 0 as the difference between the actual altitude and the desired altitude becomes 0. When this occurs the rate detector 86, after a sufficient delay, engages the conventional altitude hold apparatus of the flight control system.

Thus it will be seen that the present invention provides a low cost altitude preselect apparatus which is compatible with existing automatic flight control equipment, and advantageously utilizes existing aircraft instruments and sensors, such as the pneumatic encoding altimeter.

Another advantage of the invention is that the point at which capture occurs depends upon the rate of climb or descent that has been selected by the pilot. To demonstrate this advantage consider the second example in which it will be assumed that the aircraft is climbing from 5,000 to 9,000 feet at a climb rate of 44 feet per second. At this slower climb rate, designated by dashed lines in FIG. 5, capture will not occur until the aircraft is within approximately 440 feet of the desired 9,000 feet. Thus by cutting the climb rate in half from 88 feet per second to 44 feet per second, the point of capture is more than cut in half. This has the benefit of permitting late capture when closing rates are low and allowing a greater margin of error when closing rates are high.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for an automatic flight control system of an aircraft having an altimeter capable of providing signals representative of incremental changes in altitude, said apparatus comprising:
    means for providing a signal representing vertical speed of said aircraft;
    first manually operable control means for selecting a desired altitude and for providing a signal representing that altitude;
    means coupled to receive said incremental altitude signal and said vertical speed signal for producing a signal representing an instantaneous altitude;
    means coupled to receive said desired altitude signal and said instantaneous altitude signal for providing a preselected vertical speed reference signal to said automatic flight control system to control said vertical speed of said aircraft until a predetermined instantaneous altitude
    is achieved, whereafter said vertical speed varies in accordance with a prescribed functional relation to altitude differences between said desired altitude and said instanteous altitude.

2. An apparatus for an automatic flight control system of an aircraft having an altimeter capable of providing signals representative of incremental changes in altitude comprising:

means for providing a signal representing vertical speed of said aircraft;

first manually operable control means for selecting a desired altitude and for providing a signal representing that altitude;

means coupled to receive said incremental altitude signal and said vertical speed signal for producing a signal representing an instantaneous altitude;

means coupled to receive said desired altitude signal, said instantaneous altitude signal and said vertical speed signal for providing a preselected vertical speed reference signal to said automatic flight control system to control said vertical speed of said aircraft when said vertical speed signal is less than said vertical speed reference signal for a predetermined time interval; whereafter said vertical speed is controlled to vary in accordance with a prescribed relation to altitude differences between said desired altitude and said instanteous altitude.

3. The apparatus according to claims 1 or 2 further comprising calibration means for referencing said instantaneous altitude to ground.

4. The apparatus according to claim 3 wherein said calibration means comprises a second manually operable calibration control providing a correction signal applied to said instantaneous altitude signal means.

5. The apparatus according to claim 4 wherein said second manually operable calibration control is disposed on said altimeter.

6. The apparatus according to claim 3 wherein said altimeter has a readout adjustment knob and said second calibration control is responsively connected to said readout adjustment knob.

7. The apparatus according to claims 1 or 2 wherein said means for providing a signal representing vertical speed of said aircraft is derived from a barometric pressure sensor.

8. The apparatus according to claim 7 wherein said means for providing a signal representing the vertical speed of said aircraft further comprises an accelerometer and a rate computer, wherein said rate computer is responsive to said barometric pressure sensor and said accelerometer for providing said vertical speed signal.

9. The apparatus according to claim 7 wherein said means for providing a signal representing the vertical speed of said aircraft further comprises an airspeed indicator, a pitch attitude indicator, and a rate computer, wherein said rate computer is responsive to said barometric pressure sensor, said airspeed indicator, and said pitch attitude indicator for providing said vertical speed signal.

10. The apparatus according to claims 1 or 2 further comprising a visual readout responsive to said first manually operable control means on which said desired altitude is displayed.

11. The apparatus according to claims 1 or 2 wherein said instantaneous altitude signal means comprises means for time integration of said vertical speed signal over an interval between successive increments of said incremental altitude signal.

12. The apparatus according to claim 11 wherein said instanteous altitude signal means further comprises switching means responsive to said incremental altitude signal for selectively applying said incremental altitude signal to said means for time integration.

13. The apparatus according to claims 1 or 2 further comprising first means for comparing said desired altitude signal with said instantaneous altitude signal and for producing a first error signal representing the relative error therebetween.

14. The apparatus according to claims 1 or 2 further comprising first lag compensation means responsive to said instanteous altitude signal for delaying said instanteous altitude signal thereby reducing affects of momentary pressure changes on operations of said apparatus.

15. The apparatus according to claims 1 or 2 further comprising signal limiting means responsive to said instantaneous altitude signal for limiting maximum rate of change thereof.

16. The apparatus according to claims 1 or 2 wherein said speed reference signal is characterized by a function of the difference between said desired altitude and said instantaneous altitude, wherein the value of said function decreases with a decrease in the absolute value of said difference and becomes zero as the absolute value of said difference becomes zero.

17. The apparatus according to claim 16 wherein said function is piecewise-linear.

18. The apparatus according to claim 16 wherein said preselected vertical speed reference signal means comprises function generating means responsive to said first error signal for producing said speed reference signal.

19. The apparatus according to claim 14 further comprising second lag compensation means responsive to said vertical speed signal for delaying said vertical speed signal thereby reducing affects of transient atmospheric pressure and vertical speed fluctuations on operations of said apparatus.

20. The apparatus according to claims 1 or 2 further comprising signal limiting means responsive to said vertical speed signal for limiting maximum rate of change thereof.

21. The apparatus according to claims 1 or 2 further comprising means for comparing said vertical speed signal with said speed reference signal and for producing an error signal representing relative error therebetween.

22. The apparatus according to claims 1 or 2 further comprising means for comparing said speed reference signal and said vertical speed signal and for producing a signal when said vertical speed signal is at least equal to said speed reference signal.

23. The apparatus according to claim 21 further comprising capture detector means responsive to said second error signal and said speed reference signal for producing a signal when the polarities of said signals differ.

24. The apparatus according to claim 1 further comprising an automatic altitude hold apparatus associated with said automatic flight control system and means for engaging said altitude hold apparatus when said predetermined instantaneous altitude is achieved.

25. The apparatus according to claim 2 further comprising an automatic altitude hold apparatus associated with said automatic flight control system and means for engaging said altitude hold apparatus after said predetermined time interval is elapsed.

* * * * *